United States Patent [19]

Meyer

[11] 4,364,542

[45] Dec. 21, 1982

[54] PACKING GLAND ASSEMBLY

[75] Inventor: Danny S. Meyer, Richmond, Tex.

[73] Assignee: ACF Industries, Incorporated, New York, N.Y.

[21] Appl. No.: 274,918

[22] Filed: Jun. 18, 1981

[51] Int. Cl.$^3$ .......................... F16K 41/02; F16J 15/40
[52] U.S. Cl. ...................................... 251/214; 277/59; 277/72 FM; 277/124
[58] Field of Search ............. 251/214; 277/59, 72 FM, 277/124, 17, 19

[56] References Cited

U.S. PATENT DOCUMENTS

| | | | |
|---|---|---|---|
| 2,665,151 | 1/1954 | Fisler et al. | 277/124 |
| 2,711,333 | 6/1955 | Rodgers | 277/124 |
| 3,199,876 | 8/1965 | Magos et al. | 277/72 FM |
| 3,445,393 | 5/1969 | Hinds | 277/72 FM |
| 3,519,280 | 7/1970 | Genz | 277/124 |
| 3,586,341 | 6/1971 | Whittaker et al. | 277/124 |
| 3,907,307 | 9/1975 | Maurer et al. | 277/124 |
| 4,116,451 | 9/1978 | Nixon et al. | 277/124 |
| 4,177,998 | 12/1979 | Laitkep et al. | 277/72 FM |

*Primary Examiner*—George L. Walton
*Attorney, Agent, or Firm*—Marvin J. Marnock

[57] ABSTRACT

A packing assembly for a valve stem, or the like, comprising two groups of "V"-shaped packing rings, "G" and "H", disposed about the valve stem 16 in a stuffing box 32 provided in the stem receiving bore in the vavve body or bonnet 12. Semi-fluid plastic material 69 is injected between the two groups of packing rings to move them apart and thereby axially compress and radially expand the packing rings into sealing engagement with the valve stem and stuffing box wall. The lower group of packing rings is provided with a pair of non-metallic back up adapter rings at its lower and upper ends. A similar back up adapter ring is provided at the top of the upper group of packing rings. The back up adapter rings 61, 62, 68 serve to stabilize the packing structure. They also serve as stem centralizing rings to preclude galling and scarring of the stem and as anti-extrusion rings to impede extrusion of the packing rings along the stem and bonnet. The upper adapter ring of the lower group also prevents the passage of injected plastic material to the lower group packings and thereby prevents their possible distortion and collapse during installation for sealing.

8 Claims, 3 Drawing Figures

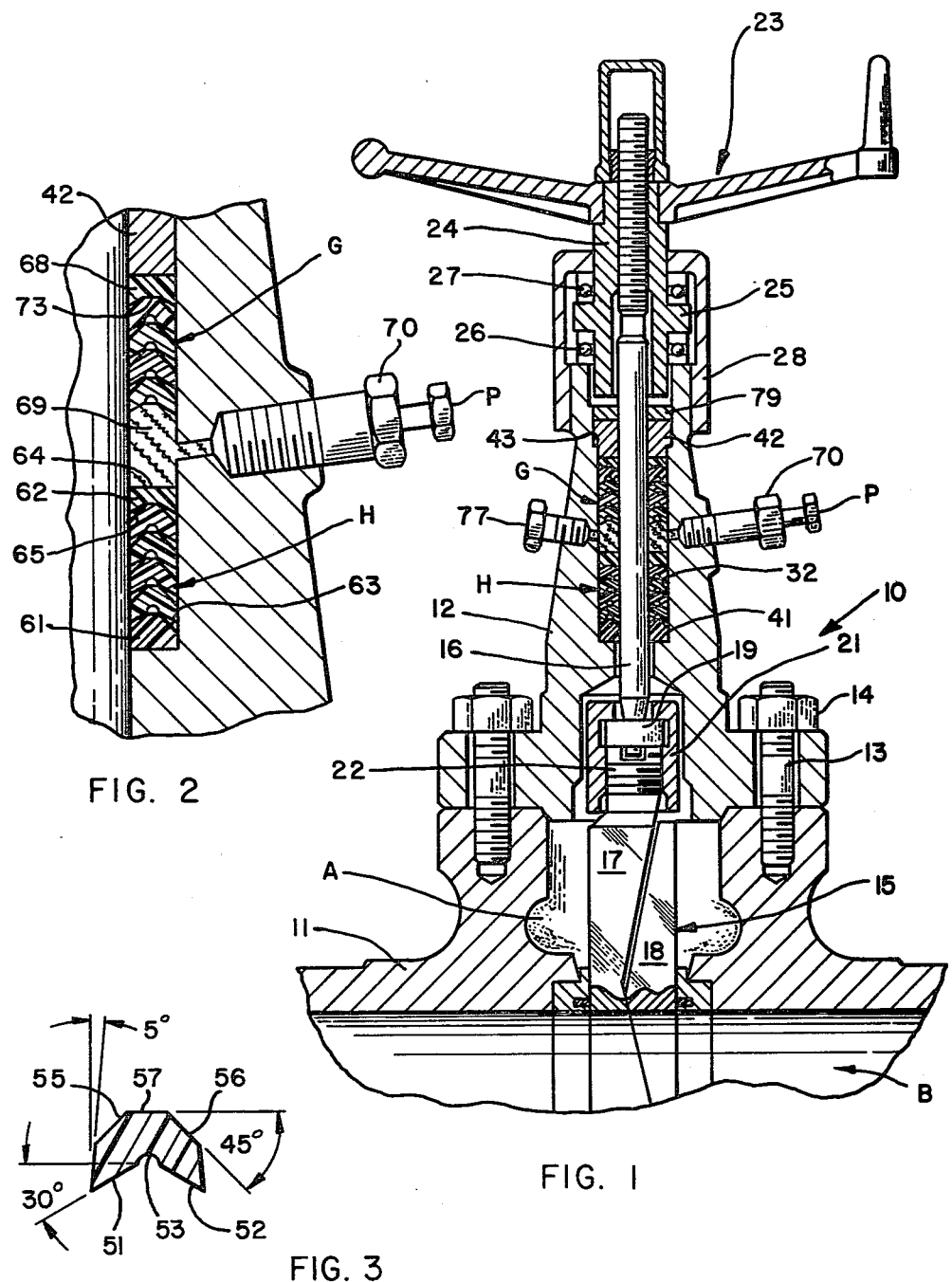

PACKING GLAND ASSEMBLY

BACKGROUND OF THE INVENTION

The invention relates to high pressure packings and more particularly to a high pressure packing for a valve stem.

Packing assemblies for sealing an annulus between the cylindrical surfaces of relatively movable members, such as the valve stem of a gate valve, conventionally employ layers of packing rings which when subjected to axial compression are urged into sealing engagement with the cylindrical surfaces. In many instances, when the packing assembly is subjected to preloading for tightening the sealing elements to better resist leakage, the individual packing rings are damaged by cocking or rolling. In a packing assembly such as disclosed in U.S. Pat. No. 4,177,998 a plastic sealing material is injected into the stuffing box between upper and lower sets of packing rings for effecting a radial expansion of the packing rings. With a typical pressure fitting, the plastic is oftentimes injected at a pressure which exceeds the strength of the packing rings thereby causing the packing rings to extrude from the packing chamber or stuffing box. In some instances, the plastic will leak past the uppermost packing ring of the lower set of packing rings thereby causing their collapse.

Another serious problem often encountered with packing assemblies which utilize metal expander rings as in the aforesaid patent derives from the tendency of the valve stem to move off center when side loads are applied as might occur from injection of the plastic sealing material or from off center loads in the valve chamber. The metal rings can therefore cause galling of the stem when there is stem movement such that the packing assembly is unable to effect a seal against the stem surface or the valve stem becomes locked and renders the valve inoperative.

It is, accordingly, an object of the invention to provide an improved packing assembly for valve stems, or the like, which comprises packing rings and back up members for effecting a seal and is resistant to the application of side loads on the stem as would lead to off centering and galling of the stem.

It is another object to provide an improved packing assembly for a valve stem, or the like, wherein the sealing elements can be initially tightened to resist leakage without causing distortion or collapse of the sealing elements.

It is a further object to provide an improved packing gland assembly for a valve stem, or the like, of the type which comprises packing rings and back up adapter members as sealing elements in a stuffing box and which more effectively prevents the extrusion of the packing rings from the stuffing box during initial pressurization of the assembly for effecting a seal and during the application of external pressures on the packing gland.

A still further object is to provide an improved packing assembly for a valve stem, or the like, which is of the type comprising packing rings as sealing elements in a packing chamber and wherein a semi-fluid plastic is injectible into the packing chamber for effecting an initial pressurization of the packing assembly with a radial expansion and tightening of the sealing elements to resist leakage without causing the distortion or collapse of the packing rings during the initial pressurization.

SUMMARY OF THE INVENTION

A novel packing assembly for sealing the annulus between the cylindrical surfaces of relatively movable members such as a valve stem and a valve body, is provided. The assembly comprises upper and lower sets of internested "V" type packing rings in an "open" seal or "closed" seal box arrangement in a stuffing box provided by an enlargement of the valve stem receiving bore. The lower set of rings is sandwiched between a pair of back up adapter rings of a non-metallic preferably fluoropolymer composition having a yield strength corresponding to the test pressure normally in the range of 25% to 100% beyond expected operating pressure. The upper set of rings is sandwiched between an upper back up adapter ring and a soft, pliable plastic material which separates the two sets. Initial pressurization of the assembly is accomplished by injection through a pressure fitting of additional soft, plastic material between the sets of rings to cause an axial compression and a radial expansion of the packing rings for effecting an initial seal. The back up adapter rings act as stem centralizing rings to prevent galling and scarring of the valve stem. The adapter ring atop the lower set precludes passage of injectible plastic into the lower set of rings as would lead to the possible distortion and collapse of the rings.

BRIEF DESCRIPTION OF THE DRAWINGS

In the accompanying drawings which illustrate the invention,

FIG. 1 is a longitudinal section illustrating the invention applied to the stuffing box of a gate valve stem;

FIG. 2 is an enlarged sectional view showing the packing assembly for the valve stem in FIG. 1 in an unloaded condition; and FIG. 3 is a radial sectional view of a hinge type packing ring which is particularly suited for the invention.

DETAILED DESCRIPTION OF THE PREFERRED EMBODIMEMT

Referring more particularly to the drawings, FIG. 1 shows the invention applied to an expanding gate valve 10, as described and claimed in U.S. Pat. No. 3,823,911 dated July 16, 1974. The gate valve 10 includes a valve body 11 which is provided with a central valve chamber "A" and a flow passage "B". When the valve 10 is installed in a flowline with the flow passage "B" in alignment therewith, the valve is adapted to control the flow in the line. The valve 10 is also provided with a bonnet 12 which is bolted to the top of the valve body 11 by bolts or bonnet studs 13 and nuts 14. Valve opening and closing is effected by a gate assembly 15 which is disposed in the valve chamber "A" and is selectively positionable therein by means of operation of the valve stem 16, to be hereinafter described. In the valve 10, the gate element 17 having a V-shaped recess in one side which receives a conforming wedge shaped segment 18. The elements 17 and 18 are each provided with a bore extending transversely therethrough which align with each other and the flow passage "B" in the open position of the valve when the gate assembly is in the upper part of the valve chamber "A" as is shown in FIG. 1. When the gate is moved downward to a lowermost position in the valve chamber, the gate assembly elements 17, 18 block the flow passage "B" and the valve is closed.

As pointed out above, positioning of the gate assembly 15 to open or close the valve is effected by operation of the valve stem 16 which drives the gate assembly 15. As is well known with expansible type gate valves, a relative longitudinal movement is effected between the gate element 17 and the segment 18 by means of appropriate stops, not shown, in the valve body to limit longitudinal movement of the segment when the gate assembly is driven by the valve stem. Although the gate 17 and segment 18 are normally spring-biased together by springs (not shown) this relative movement results in a lateral expansion of the gate assembly to a fully expanded condition for sealing purposes when the gate assembly is in its fully open or fully closed positions.

The actuating valve stem at its lower end, has an enlargement 19 received in an inverted cup 21 which is threadedly secured to a pin 22 projecting upwardly from the gate element 17 of the gate assembly 15. A valve manipulating wheel 23 is secured to the upper end of a sleeve 24 which is threadedly mounted about the upper end of the valve stem. The sleeve 24 has an intermediate external collar 25 supported between bearings 26 and 27 which are maintained in an enclosing bearing housing 28 threadedly secured to the upper end of the bonnet 12. As will be evident, rotation of the handwheel 23 relative to the valve stem 16 raises or lowers the stem and, with it, the dovetail gate element 17 and the other components of the gate assembly 15.

The novel packing assembly 31, which represents a preferred embodiment of the invention is received in a stuffing box 32 defined by the annular space between the valve stem 16 and the bore wall of an enlargement of the valve stem receiving bore which extends through the bonnet 12 to the valve chamber "A". The annular space which defines the stuffing box is terminated at its lower end by the annular shoulder 41 provided by the enlargement of the valve stem receiving bore. At its upper end, the stuffing box is terminated by a retainer ring 42 which has an external annular flange in seating engagement with another annular shoulder 43 provided by a further enlargement of the valve stem receiving bore.

As best seen in FIG. 2, the packing consists mainly of upper and lower groups or sets "G" and "H" of internested layers of packing rings, which are generally "V"-shaped or "U"-shaped in radial cross section and are in the form of molded or machined rings of a suitable elastomeric or fluoroplastic high pressure sealing material. Where diethylamine inhibitors are used in the flowline, a particularly suitable material for the packing rings is a Ryton/Carbon/Teflon composition known as 631 Ryton filled packing which is available from the EGC Corporation. Ryton is a polyphenylene sulfide product of the Phillips Company.

The packing rings in the sets "G" and "H" are preferably what are known as hinge type or "S" style packing rings. These are approximately V-shaped in radial cross-section with generally "convex" upper surfaces and generally "concave" lower surfaces. Each lower surface comprises a pair of frusto-conical surfaces 51, 52 and a groove 53. The groove 53 is provided at the bottom of the "V"-shaped lower surface so that it is located directly between the inner and outer frusto-conical surfaces 51, 52 of the ring, thereby facilitating a hinge-like action of the ring about the apex of the "V"-shaped ring when a compressive force is applied in the vertical direction. In the uncompressed state, these frusto-conical surfaces are disposed at a 30° angle from the horizontal, each characterized by a cone angle of 120°.

The upper surface of each ring comprises a pair of frusto-conical surfaces 55, 56 and a flat annular surface 57 located therebetween. In the uncompressed state, the frusto-conical surfaces are disposed at a 45° angle from the horizontal, each characterized by a cone angle of 90°.

In the embodiment shown in FIG. 2, the rings of each group are arranged in the stuffing box with their convex surfaces facing upward to thereby form an "open" seal box, that is, one in which all rings point with their peripheral edges toward the source of pressurized fluid. The sizes of the rings are such that the inner diameters of the rings are slightly smaller than the diameter of the valve stem and the outer diameter of the rings are slightly larger than the diameter of the stuffing box bore. Thus, there is a snug interference fit of the rings and the stuffing box as initially installed.

The lower group "H" of packing rings is sandwiched between a lower back up adapter ring 61 and a mediate back up adapter ring 62. These adapter rings are preferably of fluoropolymer composition and more specifically, Halar 520 Fluoropolymer, which is a 20% glass filled fluoropolymer. Halar and Halar 520 Fluoropolymer are commercial products of the Allied Chemical Corporation. As installed in the valve 10, the lower adapter ring 61 seats on an annular shoulder 41 which is formed by the enlargement of the valve stem bore which defines the stuffing box 32. The lower adapter ring 61 is provided with a convex upper surface 63 of like configuration to the convex upper surfaces of the packing rings. The bottom packing ring of the set "H" is positioned with its recessed bottom facing downward and resting upon the convex upper surface of the lower adapter ring 61.

The mediate adapter ring 62 located at the top of the set "H" is provided with a planar upper surface 64 and a concave lower surface 65, of like configuration to the concave surfaces of the individual packing rings. The mediate adapter ring 62 rests with its concave surface 65 against the convex surface of the uppermost packing ring in the set "H".

The upper set "G" of "S"-type packing rings is sandwiched between an upper adapter ring 68 and a soft, pliable plastic packing 69 which is injected into the stuffing box 32 through a conventional pressure fitting 70 which is mounted in the bonnet wall. The fitting 70 includes a hand plunger "P" which can be depressed to inject semi-fluid plastic material between the mediate adapter ring 62 and the lowermost packing ring of the upper group "G" of packing rings. The upper adapter ring 68 is identical in composition and configuration to the mediate adapter ring 61 and rests with its lower face 73 against the convex upper surface of the uppermost ring in the upper set "G" of packing rings.

As will be noted in FIG. 1, a removable plug 77 is also mounted in a port which extends through the wall of the bonnet 12 at a location directly opposite the fitting 70, for purposes hereinafter explained. For installing the packing assembly during assembly of the valve 10, the lower set of packing rings "H" with back up adapter rings 61, 62 are placed around the valve stem 16 and moved to the bottom of the stuffing box 32. A ribbon or layer of the soft plastic material 69 is then placed over the lower set of packing rings "H" directly atop the mediate adapter ring 62 which serves initially as a spacer means for separating the upper set of packing rings "G" from the adapter ring 62 and the lower set "H" of packing rings. The ribbon or layer of plastic is also of sufficient quantity so when the upper set of packing rings "G" are placed atop the plastic spacer, the upper set of packing rings "G" are supported above the point of entry of the fitting 70 into the bonnet bore. After the retainer ring 42, washer 79, sleeve 24, bearings 26 and 27 and bearing housing 28 are installed, the packing assembly of this invention can then be pressurized.

For pressurizing the packing assembly, the plug 77 is removed from the bonnet and plastic material is injected through the fitting 70 into the stuffing box 32 directly above the mediate adapter ring 62. A suitable injectible plastic material is W-K-M No. 109 TFE/Asbestos, a product of the W-K-M Division of ACF Industries, Incorporated. This is a flexible, plastic material which consists of a chemical and solvent resistant oil, Teflon, binders, wood chips and a friction-reducing aggregate. As plastic material begins to pressurize the packing assembly, air from the stuffing box is vented through the port which is adapted to receive the plug 77. As injection continues and plastic material fills the available space in the stuffing box 32 and then begins to extrude from the stuffing box thorugh this same plug port, the plug 77 is then installed in the bonnet wall.

Further injection of plastic material through the fitting 70 is then accomplished to pressurize the packing assembly to a pressure in the range of 4,000 to 8,000 p.s.i. It will therefore be seen that the washer 79 atop the retainer ring 42 will abut the bottom of sleeve 24 when the packing is pressurized. However, this longitudinal expansion of the packing assembly may be restricted by threadedly connecting the retainer ring in the bonnet bore, if desired. The packing rings are also radially expanded to tightly seal the annulus. The rings are compacted such that their frusto-conical upper surfaces 51, 52 are then disposed at an angle of approximately 30° from the horizontal. The only voids in the packing are formed by the grooves 53.

In the packing assembly of this invention, the upper and lower adapter rings of each set of rings serve to "stabilize" the packing structure to prevent the cocking or rolling of the packing rings during the preloading pressurization with injectible plastic and after operating pressures are applied from the valve chamber. The Halar back up adapter rings 68 and 61 also serve as anti-extrusion and stem centralizing rings. The adapter ring 68 prevents extrusion of the packing rings through the gap between the retainer ring 42 and the valve stem as well as the gap between the retainer ring 42 and the wall of the enlarged bonnet bore which accommodates the packing. The lower adapter ring 61 closes the gap between the valve stem and the wall of the reduced diameter portion 33 of the valve stem bore at the lower end of the stuffing box.

The adapter rings 68, 62, and 61 are also stem centralizing rings in that they are resistant to side loads as might be applied to the stem by the injection of the plastic material 69 or from pressures in the valve chamber. The adapter ring 62 also prevents the injectible plastic material from passing below to the lower set of packing rings "H" and possibly inducing their collapse as has occured with metal back up adapter or expander rings.

The stem centralizing feature and the absence of metal rings in the packing assembly significantly reduces the possibility of scarring or galling of the valve stem which has occurred with other types of packing glands. In some instances, the degree of scarring and galling of the valve stem was sufficient to render the valve inoperative because of inability to seal or even to move the valve stem.

It will therefore be seen, that the packing gland assembly of this invention is particularly designed for sealing the annulus between a valve stem and the valve body or valve bonnet. It is particularly useful with either gate valves or ball valves and is suitable for sealing both rising or non-rising valve stems. The packing assembly will perform effectively to withstand pressures up to 20,000 p.s.i. and temperatures up to 250° F.

Fluoroplastic material is preferred for the packing rings, however, elastomeric materials having durable sealing properties might also be used. The back up adapter rings have been described as being preferably of a fluoropolymer composition, a melt-processible thermoplastic. However, for operating temperatures above 250° F., the yield strength for such materials declines precipitously. A more suitable material at temperatures above 250° F. is compacted "Grafoil," a graphite material which has the unique combination of high temperature stability, resiliency and lubricity. "Grafoil" reinforced interiorly with metallic mesh is also suitable. Metallic adapter rings are unsuitable since the metal-to-metal contact with the valve stem leads to scarring and galling. However, a material should be selected which when in compression has a yield strength which is equal to or approximates the test pressure for the valve. The test pressure conventionally exceeds the expected working pressure by a specified amount in the range of 25% to 100%.

The foregoing description of a preferred embodiment of the invention has been presented for purposes of illustration and description and is not intended to limit the invention to the precise form disclosed as changes in details of the illustrated construction may be made by those skilled in the art, within the scope of the appended claims, without departing from the spirit of the invention.

What is claimed is:

1. A valve having a valve body with a fluid passage therethrough for receiving a pressurized working fluid and having a packing assembly for a valve stem or shaft extending through a packing chamber having packing stops at the end thereof, said packing assembly comprising:
    a first lower set of packing rings, each of said packing rings being of a polymeric composition and of the V-type configuration in radial cross-section and having a convex surface and a concave surface, said packing rings being arranged in an internested relationship in a stack about the valve stem in contacting relationship with the stem and bonnet;
    a second upper set of packing rings, each of said packing rings in said upper set being of a polymeric composition and of the V-type configuration having a convex and a concave surface, said upper set of packing rings being arranged in an internested stacked relationship about the valve stem in contacting relationship with the stem and bonnet, said upper and lower sets of packing rings being disposed in said packing chamber with all their concave surfaces of the upper set of packing rings facing in the direction of fluid pressure from said flow passage;
    a pair of anti-extrusion rings arranged about the valve stem at opposite ends of the stack of the lower set of packing rings to sandwich the packing rings of said lower set between said pair of anti-extrusion rings;

a third anti-extrusion ring arranged about the valve stem and disposed atop the stack of the upper set of packing rings;

a soft, plastic sealing material interjected under pressure into the packing chamber between said upper and lower sets of packing rings to pressurize and axially compress said packing assembly and thereby inducing a radial expansion of the packing rings to effect a tight, sealing relationship between the packing rings and said valve stem and bonnet, said anti-extrusion rings contactng the stem and bonnet with substantially zero clearance therewith and being formed of a non-metallic harder, more rigid substance than said packing rings and having a yield strength which exceeds the expected working pressure for the valve in the range of 25% to 50% and corresponds to the test pressure for the valve to permanently deform said anti-extrusion rings to impede extrusion of the packing rings along the stem and bonnet when said packing rings are subjected to axial compression and to provide for stem centralization.

2. A packing assembly as described in claim 1 wherein said anti-extrusion rings are of a fluoropolymer composition.

3. A packing assembly as described in claim 1 wherein said packing rings are of a fluoroplastic material.

4. A packing assembly as described in claim 1 wherein the anti-extrusion ring at the bottom end of the lower set of packing rings has a convex upper surface corresponding to the convex surfaces of the packing rings and the anti-extrusion rings at the tops of said upper and lower sets of packing rings are provided with concave surfaces corresponding to the concave surfaces of the packing rings whereby said packing rings and anti-extrusion rings are disposed in an internested stacked relationship.

5. A packing assembly as described in claim 1 wherein said anti-extrusion rings are of compacted graphite material.

6. A packing assembly as described in claim 1 wherein said V-type packing rings are of the hinge type, being adopted to move in a hinge-like action about their apices where said rings are placed in axial compression and wherein the surface of the concave side of each packing ring is more acutely convergent than the convex surface of the ring before said packing assembly is axially compressed.

7. A packing assembly as described in claim 1 wherein a fitting injection means is mounted in communication with said packing chamber for the selective injection of said plastic sealing material under pressure into the packing chamber between said upper and lower sets of packing rings.

8. In a high pressure valve having a valve body presenting a fluid flow passage therethrough for receiving a pressurized working fluid, a valve member mounted for movement between an open position and a closed position relative to the flow passage, and a movable valve stem connected with the valve member to effect movement thereof between the open and closed positions, the improvement comprising:

a bonnet on the valve body and having a bore therethrough which receives the valve stem;

a packing chamber provided in the valve stem receiving bore and being defined by an annular space provided by an enlargement of said bore, said packing chamber terminating at its lower end in a packing stop provided by an annular shoulder in the bore facing away from the flow passage and at its upper end by a packing stop provided by a retainer ring mounted in said bore;

a packing assembly in said packing chamber, said packing assembly consisting of a first lower set of packing rings, each of said packing rings being of a polymeric composition and of the V-type configuration in radial cross-section with a convex surface and a concave surface, said packing rings being arranged in internested relationship in a stack about the valve stem in contacting relationship with the stem and bonnet;

a second upper set of packing rings, each of said packing rings in said upper set being of a polymeric composition and of the V-type configuration in radial cross-section with a convex surface and a concave surface, said upper set of packing rings being arranged in an internested stacked relationship about the valve stem in contacting relationship with the stem and bonnet, said upper and lower sets of packing rings being disposed in said packing chamber with all the concave surfaces of the upper sets of packing rings facing in the direction of fluid pressure from said flow passage;

a pair of anti-extrusion rings arranged about the valve stem at opposite ends of the stack of the lower set of packing rings to sandwich the packing rings of said lower set between said pair of anti-extrusion rings;

a third anti-extrusion ring arranged about the valve stem and disposed atop the stack of the upper set of packing rings, said anti-extrusion rings contacting the stem and bonnet and being formed of a non-metallic, harder, more rigid substance than said packing rings with a yield strength which exceeds the expected working pressure for the valve in the range of 25% to 50% and corresponds to the test pressure for the valve to permanently deform said anti-extrusion rings to impede extrusion of the packing rings along the stem and bonnet when said packing rings are subjected to axial compression;

a soft, plastic sealing material interjected in the packing chamber between said upper and lower sets of packing rings;

and a fitting means provided in said bonnet and communicating with said packing chamber for selective injection of an additional quantity of said soft, plastic sealing material between said upper and lower sets of packing rings to axially compress the packing assembly and induce a radial expansion of said packing rings to effect a tight, sealing relationship between said packing rings and said valve stem and bonnet.

* * * * *